Patented July 2, 1940

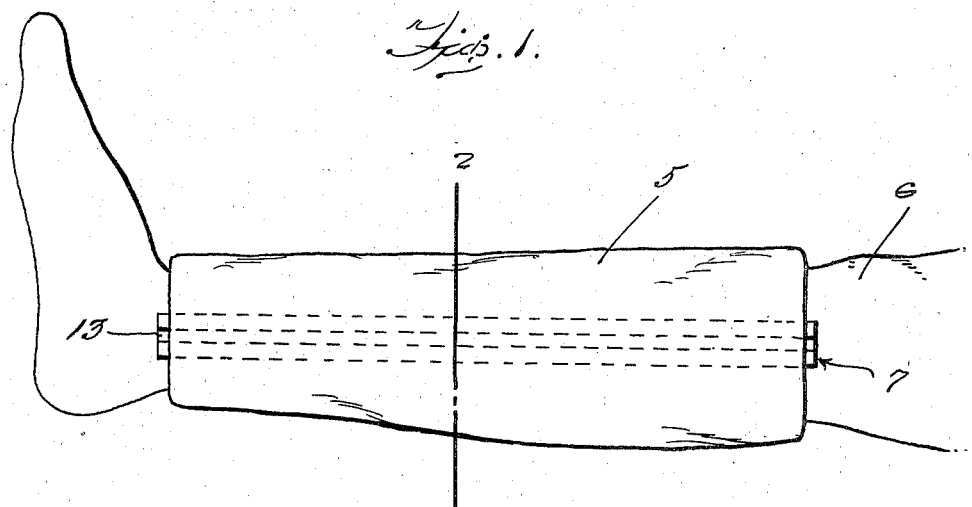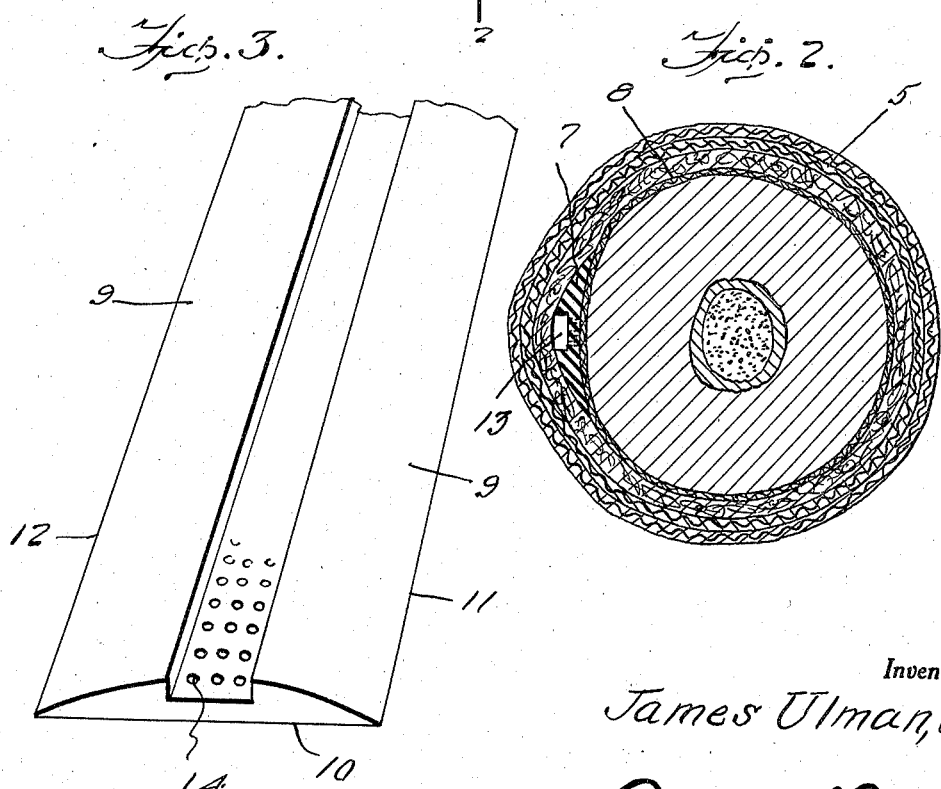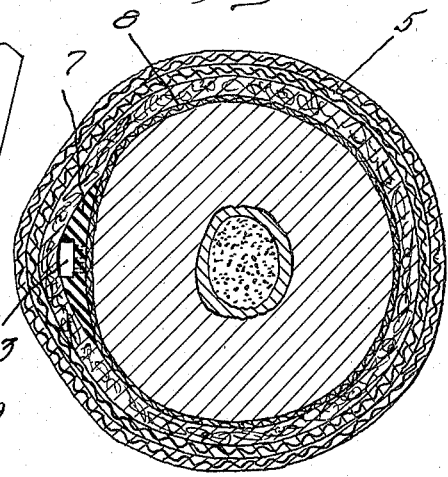
Inventor
James Ulman, Jr.
By Clarence A. O'Brien
and Hyman Berman
Attorneys

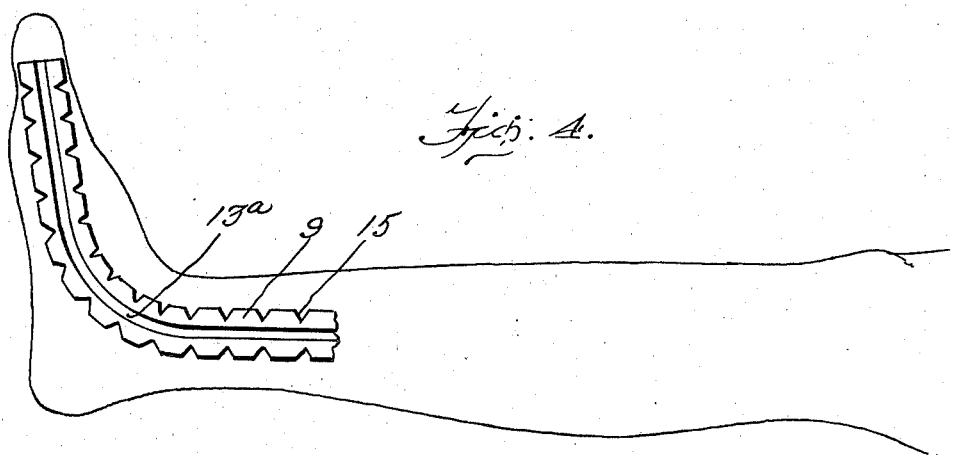
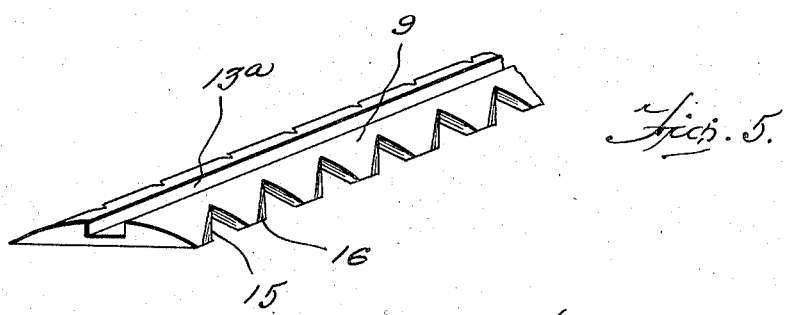
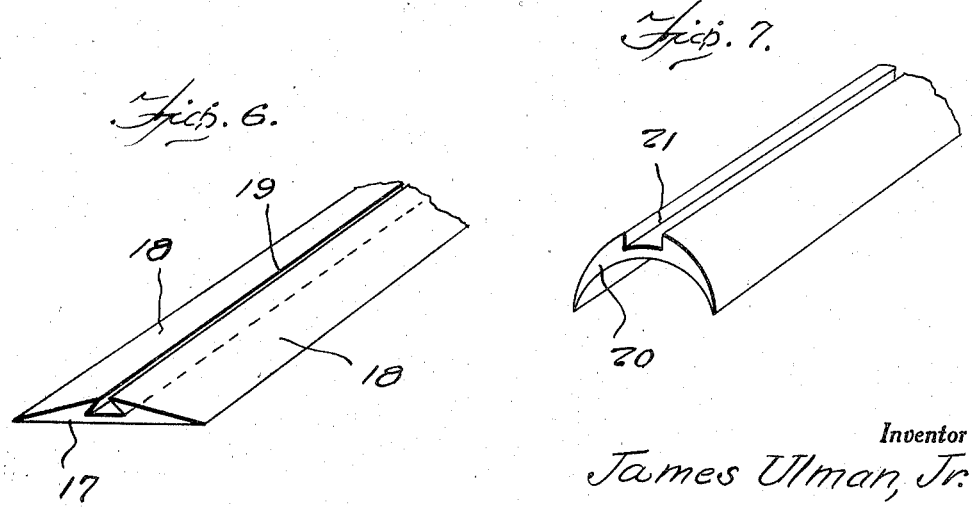

2,206,339

UNITED STATES PATENT OFFICE 2,206,339

CAST CUTTING GUIDE

James Ulman, Jr., Chicago, Ill.

Application November 15, 1938, Serial No. 240,555

1 Claim. (Cl. 128—91)

This invention appertains to new and useful improvements in guide means for facilitating the cutting of casts such as are used on leg fractures and on other members of the body.

The principal object of the present invention is to provide a guide which will leave space under the cast to permit the usual cast cutter to cut entirely through the cast without chance of injury to the patient.

Other objects and advantages of the invention will become apparent to the reader of the following specification:

In the drawings:

Figure 1 represents a fragmentary side elevational view showing the guide in use with a cast.

Figure 2 is a section on line 2—2 of Figure 1.

Figure 3 is a fragmentary perspective view of one form of guide.

Figure 4 is a side elevational view of another form of guide.

Figure 5 is a fragmentary perspective view of the form of guide shown in Figure 4.

Figure 6 is a perspective view of a third form of guide.

Figure 7 is a perspective view of a fourth form of guide.

Referring to the drawings wherein like numerals designate like parts, it can be seen in Figures 1 and 2 that numeral 5 represents the cast which is disposed around the leg 6 in the usual manner with the exception that the guide 7 is first disposed against the leg or a first wrapping around the leg as denoted by numeral 8. As can be seen in the drawings, each of these guides has a slot, which of course leaves a space after the cast 5 has been disposed over the guide in convoluting or wrapping the material around the leg.

The form of the invention shown in Figure 3 consists of an elongated strip 9 preferably of some suitable resilient material such as rubber, this strip being preferably flat on its bottom side 9 while its top side slopes towards its edge portions 11 and 12 from the side walls of the trough or guide groove 13. From the bottom of this guide groove 13 openings 14 extend through the strip and these serve to afford ventilation to the leg.

Another form of the invention is shown in Figure 4 wherein the sloping sides 9, sloping towards the edges from the trough 13a have V-shaped notches 15 therein and the edge portions of the strip at these notches are bevelled as at 16 to prevent any spot pressure on the leg.

The object in having the strip notched in the manner shown in Figures 4 and 5 is so that the strip can be disposed in curves and in angles to take care of various distortions it must follow.

Still another form of the invention is shown in Figure 6 wherein the strip 17 has the bevelled portions 18—18 extending downwardly from the upper edges of the walls of the trough 19. This trough is of dovetail shape so that there is very little likelihood of any of the cast getting into the guide channel.

The form of the invention shown in Figure 7 shows a transversely arcuate strip 20 which on its outer side has the trough 21 formed for guiding the cast-cutting instrument (not shown). This type of guide is especially adapted for small members such as the wrist and of course may be made in small sizes for the fingers.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A cast cutting guide for use in fracture casts comprising an elongated strip formed with a cast cutter guide groove therein, said strip being formed with ventilating openings extending through the strip from the bottom of the said groove.

JAMES ULMAN, Jr.